United States Patent
Reiley et al.

(10) Patent No.: US 7,396,770 B2
(45) Date of Patent: Jul. 8, 2008

(54) POST-PARTING ETCH TO SMOOTH SILICON SLIDERS

(75) Inventors: Timothy Clark Reiley, San Jose, CA (US); Nicholas Buchan, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 179 days.

(21) Appl. No.: 11/329,930

(22) Filed: Jan. 10, 2006

(65) Prior Publication Data

US 2007/0158301 A1 Jul. 12, 2007

(51) Int. Cl.
*H01L 21/302* (2006.01)
(52) U.S. Cl. .................. 438/706; 438/723
(58) Field of Classification Search .......... 438/706, 438/710, 712, 719, 723, 745; 216/58, 67, 216/74, 79
See application file for complete search history.

(56) References Cited

U.S. PATENT DOCUMENTS

| | | | | |
|---|---|---|---|---|
| 5,462,637 A * | 10/1995 | Thiele | ............ | 216/22 |
| 5,650,043 A | 7/1997 | Kaji et al. | ............ | 156/662.1 |
| 5,772,493 A * | 6/1998 | Rottmayer et al. | ............ | 451/5 |
| 5,997,700 A | 12/1999 | Fukushima et al. | ............ | 204/192.35 |
| 6,001,268 A | 12/1999 | Nguyen et al. | ............ | 216/67 |
| 6,027,571 A | 2/2000 | Kikuyama et al. | ............ | 134/3 |
| 6,088,907 A | 7/2000 | Lee et al. | ............ | 29/603.03 |
| 6,556,380 B2 | 4/2003 | Bunch et al. | ............ | 360/235.1 |
| 6,623,330 B2 * | 9/2003 | Fukuroi | ............ | 451/5 |
| 6,776,690 B2 * | 8/2004 | Bunch et al. | ............ | 451/29 |
| 6,858,537 B2 | 2/2005 | Brewer | ............ | 438/692 |
| 6,859,346 B1 | 2/2005 | Meyer | ............ | 360/294.5 |
| 2002/0089787 A1 | 7/2002 | Lu et al. | ............ | 360/235.1 |
| 2002/0104822 A1 | 8/2002 | Naydenkov et al. | ............ | 216/24 |
| 2003/0000919 A1 | 1/2003 | Velebir, Jr. | ............ | 216/24 |
| 2004/0045671 A1 * | 3/2004 | Rejda et al. | ............ | 156/345.38 |
| 2004/0069318 A1 | 4/2004 | Kanayama et al. | ............ | 134/1.3 |
| 2004/0109258 A1 * | 6/2004 | Krause et al. | ............ | 360/78.06 |
| 2004/0264050 A1 | 12/2004 | Brock et al. | ............ | 360/234.3 |

FOREIGN PATENT DOCUMENTS

| | | |
|---|---|---|
| JP | 2152278 | 6/1990 |
| JP | 4114377 | 4/1992 |
| JP | 7326034 | 12/1995 |
| JP | 10172124 | 6/1998 |

OTHER PUBLICATIONS

K. Itaya,. R. Sugawa, Y. Morita, H. Tokumoto, "Atomic Resolution Images of H-Terminated Si(111) Surfaces in Aqueous Solutions", Appl Phys. Lett. 60 (20), May 18, 1992, pp. 2534-2536.

S.K. Yan, S. Peter, C.G. Takoudis, "Fundamentals of Two-Step Etching Techniques for Ideal Silicon-Hydrogen termination of Silicon (111)" J.Appl. Phys. 76 (7) Oct. 1, 1994 pp. 4107-4112.

* cited by examiner

*Primary Examiner*—Kin-Chan Chen
(74) *Attorney, Agent, or Firm*—John L. Rogitz

(57) ABSTRACT

To smooth silicon sliders that have been parted from each other on a wafer by DRIE, an isotropic etch using fluorine either in a gas or in an aqueous solution is performed prior to separating the individual sliders from the wafer.

14 Claims, 2 Drawing Sheets

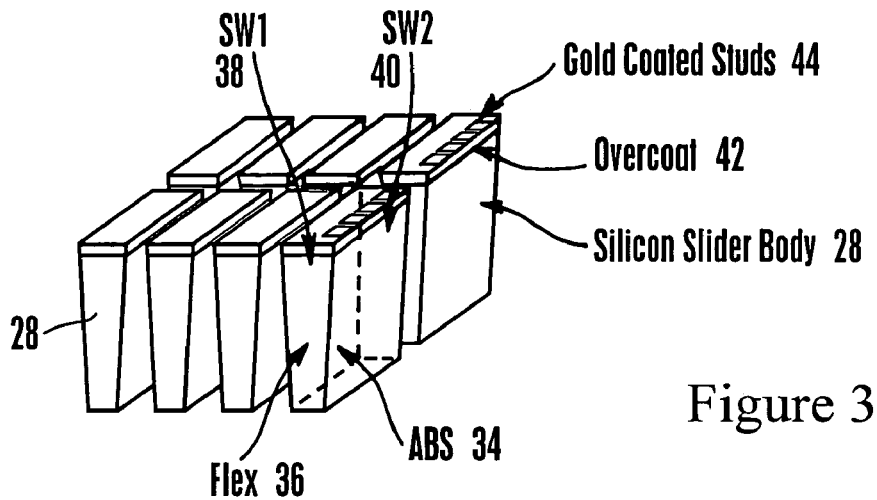
Figure 3
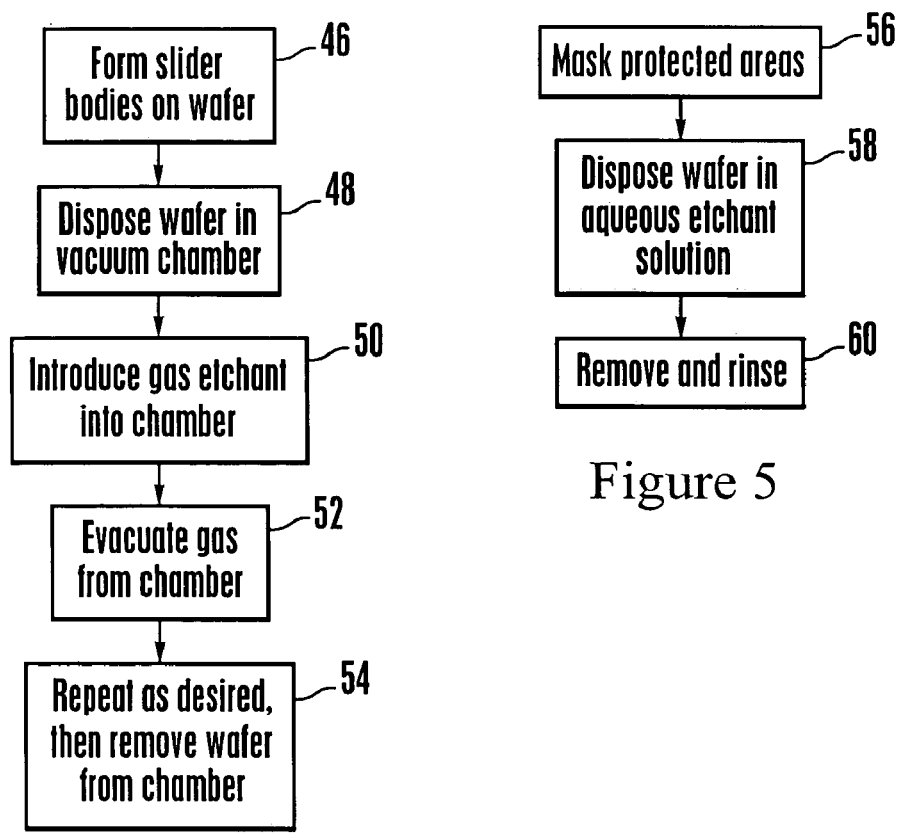
Figure 4
Figure 5

POST-PARTING ETCH TO SMOOTH SILICON SLIDERS

FIELD OF THE INVENTION

The present invention relates generally to disk drives.

BACKGROUND OF THE INVENTION

Recently, silicon has become a primary candidate to replace the material used as the substrate for making magnetic recording head sliders. This has been facilitated by the use of a new parting process, a dry etch process known as Deep Reactive Ion Etching (DRIE), to form the slider bodies from the finished wafer. Essentially, using DRIE the sliders are parted from each other on the wafer prior to being detached therefrom.

DRIE uses a high density plasma to achieve a high aspect ratio etch, which exceeds the aspect ratio available using diamond saws. This high aspect ratio etch translates into a reduced "kerf", which in turn allows a higher packing density of sliders on the wafer and reduced manufacturing costs. Furthermore, because the etching process is entirely chemical in nature, there is no localized cracking or mechanical damage generated in the sliders. Diamond saws, on the other hand, generate cracks in the sliders or groups of sliders cut from the wafer. The cracks can then, over time, propagate and produce particles which can cause failure in a magnetic disk drive.

The shedding of particles from sliders, and the resultant head-disk interaction (HDI) which produces scratches in the magnetic disk and damage to the data therein, is an ongoing concern for the slider recording head and magnetic disks. It is reasonable to expect that HDI will also be of concern for the interaction of the silicon slider with magnetic disks.

As described above, the elimination of mechanical damage in the parting operation for silicon sliders has been well addressed by the DRIE process; however, the present invention understands that although the as-etched surfaces are quite smooth, some residual roughness of a short length scale may be generated on all four processed surfaces of the slider, namely, the "flex" surface, the air bearing surface (ABS), and the surfaces commonly referred to as SW1 and SW2. As further recognized herein, the roughness is largely the same in character on all four sides. The present invention critically understands that the residual peak-to-valley roughness, measured over the full slider face, may be on the order of two microns, and can result in protrusions that are one to four microns wide.

Currently, the shedding of particles in magnetic disk drive sliders for both AlTiC sliders and silicon sliders is undertaken by lapping the ABS surface, and then using numerous additional cleaning processes prior to installation in a drive. Nonetheless, the present invention critically recognizes that particle shedding remains a reliability concern, and that using numerous processes for the same task cascades costs. Having made this critical observation, the invention disclosed herein is provided.

SUMMARY OF THE INVENTION

A method for removing surface particles and protrusions from silicon slider bodies includes forming the bodies on a wafer using, e.g., deep reactive ion etching (DRIE). The method also includes, while the slider bodies remain attached to the wafer, exposing the wafer to an isotropic etching substance.

In some implementations the etching substance is a gas that preferentially etches silicon with respect to overcoat material and gold stud material. The etching substance may be, e.g., $XeF_2$. For gaseous etching the method can include exposing the wafer to the gas, evacuating the gas away from the wafer, and exposing the wafer to the gas at least a second time. The gas advantageously may have a selectivity to silicon with respect to the overcoat material and gold stud material of at least one hundred. In other implementations, the etching substance is an aqueous solution that can include, e.g., $NH_4F$.

In another aspect, a method for processing slider bodies includes forming silicon slider bodies on a wafer, and removing unwanted material from the slider bodies by exposing the bodies to an isotropic etchant.

In still another aspect, a method for making sliders includes exposing plural slider bodies at once to an isotropic etchant to cause silicon on the slider bodies to react with fluorine in the etchant.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a schematic close-up view of the sliders shown in FIG. 2;

FIG. 4 is non-limiting flow chart showing one post-parting etch process, using a gas; and FIG. 5 is non-limiting flow chart showing a post-parting etch process that uses an aqueous solution.

DETAILED DESCRIPTION OF THE PREFERRED EMBODIMENT

Figure 1:
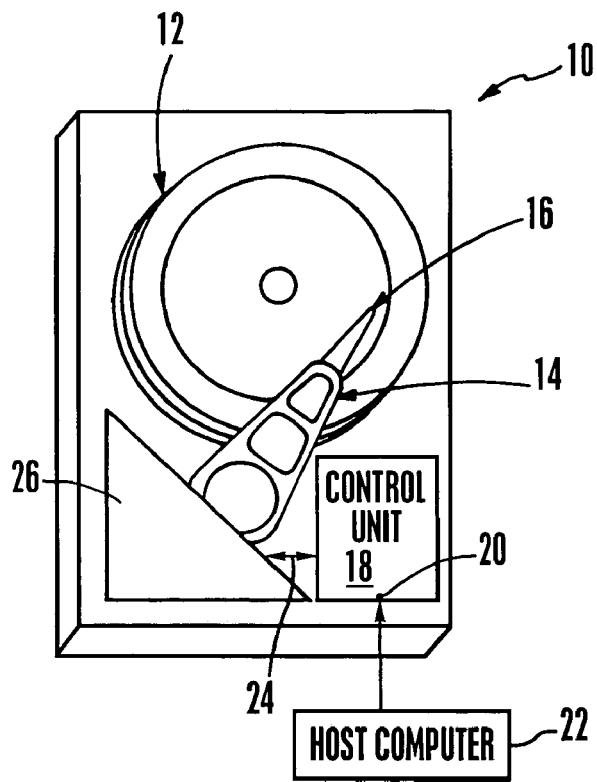
FIG. 1 is a perspective view of an exemplary embodiment of a storage device, configured as a hard disk drive, with portions of the housing broken away.

Referring initially to FIG. 1, an exemplary non-limiting storage device is shown, generally designated 10, for storing multimedia and other data on a storage medium 12 that in one embodiment may be implemented by plural storage disks in a hard disk drive. When implemented as a hard disk drive, the device 10 includes an arm 14 having a slider 16 that includes read and/or write heads in accordance with hard disk drive principles, with the slider 16 being made by the process disclosed herein. The data storage region 12 may be managed by a controller 18 that can be a conventional hard disk drive controller modified per the logic below. Or, the controller 18 may be a controller separate from the hard disk drive controller. The controller 18 may be implemented by a chip. The controller and storage disks are sealed in a housing.

The controller 18 may receive input signals at an input/output terminal 20 from a host computer 22. The data input interface may be, in the case of hard disk drive implementations, serial ATA. The input signals may include read and write requests from the host computer 22. A data input and output path 24 which includes servo components 26 is provided between the controller 18 and the storage medium 12.

Figure 2:
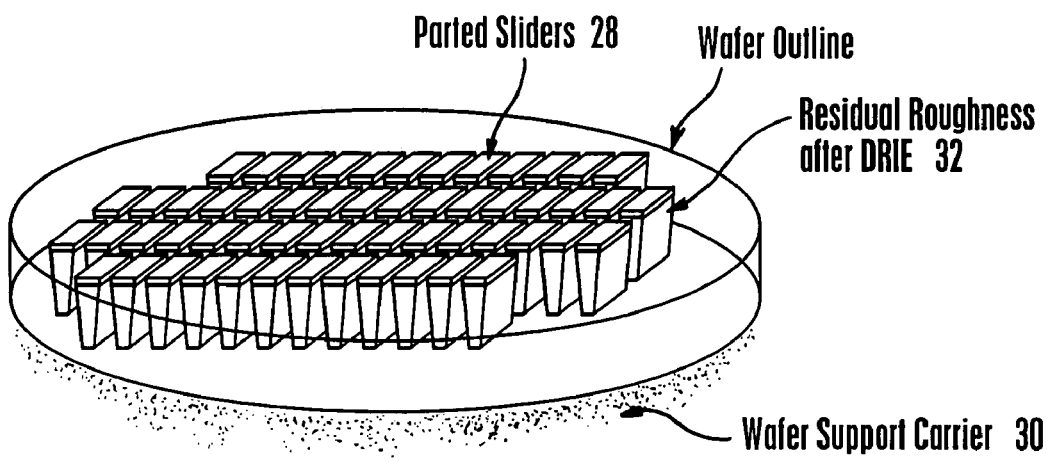
FIG. 2 is a schematic diagram of silicon sliders on a wafer, after the sliders have been parted from each other by deep reactive ion etching (DRIE)

FIGS. 2 and 3 illustrate silicon slider bodies 28 that have been separated from each other but that may remain on a silicon wafer support carrier 30, whose outline is schematically shown in FIG. 2 for illustration. In some implementations, the slider bodies 28 are established using a dry etch such as deep reactive ion etching (DRIE), although the methods below for smoothing the slider bodies are not limited by how, precisely, the bodies are initially formed. In any case, some residual roughness 32 remains on various surfaces of the bodies 28 post-DRIE.

With greater specificity, FIG. 3 shows that each slider body 28 can define a respective ABS 34 and opposed to the ABS 34 a flex surface 36. Bounding these surfaces and orthogonal thereto are opposed surfaces SW1 38 and SW2 40. Residual roughness may be equally formed on all of these surfaces.

Additionally, each slider body 28 may have deposited thereon an overcoat material 42 that may be, e.g., $SiO_2$ in accordance with principles known in the art. Also, gold-coated stud material 44 may be included on each slider body 28 for electrical connectivity purposes known in the art. As understood herein, it is preferable not to damage the overcoat material 42 or gold stud material 44 when smoothing the surfaces 34-40 of the slider body 28.

The etchant for smoothing the surfaces above preferably is isotropic, (i.e., it etches at essentially the same rate in all directions). The etchant preferably includes the element Fluorine which preferentially reacts with silicon but not with overcoat material (such as $SiO_2$) or gold.

FIG. 4 shows a process that uses a gaseous etchant, preferably $XeF_2$. The gas etchant preferentially etches silicon with respect to the overcoat material 42 and gold stud material 44 by a factor of, e.g., one hundred or more.

Commencing at block 46, the slider bodies 28 are formed on the wafer in accordance with principles known in the art. For example, the bodies 28 can be formed using deep reactive ion etching (DRIE) principles, and the bodies can be made of silicon. Then, at block 48, preferably with the slider bodies 28 still on the wafer, the wafer is disposed on a chuck in a vacuum chamber. The chuck may be slightly heated to assist in desorbing water and to prevent condensation of the gas etchant.

At block 50, the chamber is evacuated and then the etchant gas is introduced into the chamber, preferably at a temperature slightly above room temperature. At this point, the isotropic etching process occurs, wherein particles and protrusions are removed from the sides 34-40 of the slider bodies 28, producing Xe and $SiF_4$ etch products. At block 52 the gas with etch products is evacuated from the chamber, and in some implementations the above etch-evacuate cycle is repeated at block 54 with fresh etchant gas each time, for more complete etching. Upon completion of the etch, the wafer is removed from the vacuum chamber. The silicon bodies 28 subsequently are removed from the wafer.

FIG. 5 shows that alternatively, a wet etch can be used. At block 56 areas of the slider bodies that are not to be etched are protected by mask principles known in the art. For example, SiO2 overcoat and gold stud material may be protected by masking. Then, at block 58 the wafer with silicon bodies 28 is disposed in an aqueous solution that includes, e.g., $NH_4F$ etchant, which causes particles and protrusions on the sides 34-40 of the silicon bodies 28 to be removed. At block 60 the wafer is removed from the aqueous solution and the slider bodies 28 are rinsed to remove residual etchant. Subsequently, the bodies 28 are removed from the wafer.

While the particular POST-PARTING ETCH TO SMOOTH SILICON SLIDERS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A method for removing surface particles and protrusions from silicon slider bodies, comprising:
    forming the bodies on a wafer, each slider body defining a respective air bearing surface and opposed to the air bearing surface a flex surface, the air bearing surface being separated from the flex surface by orthogonal opposed surfaces; and
    while the slider bodies remain attached to the wafer, exposing the wafer to an isotropic etching substance to etch the air bearing surface, the flex surface, and the orthogonal exposed surfaces of each body at substantially the same rate at the same time.

2. The method of claim 1, wherein the etching substance is a gas that preferentially etches silicon with respect to overcoat material and gold stud material.

3. The method of claim 2, wherein the etching substance is $XeF_2$.

4. The method of claim 2, comprising exposing the wafer to the gas, evacuating the gas away from the wafer, and exposing the wafer to the gas at least a second time.

5. The method of claim 2, wherein the gas has a selectivity to silicon with respect to the overcoat material and gold stud material of at least one hundred.

6. A method for processing slider bodies, comprising:
    forming silicon slider bodies on a wafer, each slider body defining a respective air bearing surface and opposed to the air bearing surface a flex surface, the air bearing surface being separated from the flex surface by orthogonal opposed surfaces; and
    removing unwanted material from the slider bodies by exposing the bodies to an isotropic etchant to etch the air bearing surface, the flex surface and the orthogonal exposed surfaces of each body at substantially the same rate at the same time.

7. The method of claim 6, wherein the etchant is a gas that preferentially etches silicon with respect to overcoat material and gold stud material.

8. The method of claim 7, wherein the etchant is $XeF_2$.

9. The method of claim 7, comprising exposing the wafer to the gas, evacuating the gas away from the wafer, and exposing the wafer to the gas at least a second time.

10. The method of claim 7, wherein the gas has a selectivity to silicon with respect to the overcoat material and gold stud material of at least one hundred.

11. A method for making sliders comprising exposing plural slider bodies at once to an isotropic etchant to cause silicon on the slider bodies to react with fluorine in the etchant, each slider body defining a respective air bearing surface and opposed to the air bearing a flex surface, the air bearing surface being separated from the flex surface by orthogonal opposed surfaces, the air bearing surface, the flex surface, and the orthogonal exposed surface of each body being etched at substantially the same rate at the same time.

12. The method of claim 11, wherein the etchant is a gas that preferentially etches silicon with respect to overcoat material and gold stud material.

13. The method of claim 12, wherein the etchant is $XeF_2$.

14. The method of claim 12, comprising exposing the wafer to the gas, evacuating the gas away from the wafer, and exposing the wafer to the gas at least a second time.

* * * * *